United States Patent [19]
Douglas

[11] Patent Number: 4,984,685
[45] Date of Patent: Jan. 15, 1991

[54] PORTABLE CONTAINER FOR ELONGATED ELEMENTS

[76] Inventor: Frank A. Douglas, Rte. 2, Box 18, Hwy. B, Cedal Hill, Mo. 63016

[21] Appl. No.: 459,436

[22] Filed: Jan. 2, 1990

[51] Int. Cl.$^5$ .............................................. B65D 73/00
[52] U.S. Cl. ..................... 206/334; 206/328; 206/388; 206/408; 242/96
[58] Field of Search ............... 206/226, 303, 328, 334, 206/373, 388, 408, 409; 242/85.1, 96

[56] References Cited

U.S. PATENT DOCUMENTS

| | | | |
|---|---|---|---|
| 1,249,439 | 12/1917 | McCoy | 206/373 |
| 1,365,403 | 1/1921 | Holway | 206/226 |
| 2,834,078 | 5/1958 | Brundage . | |
| 2,866,540 | 12/1958 | Rothauser | 206/226 |
| 2,943,732 | 7/1960 | Kovaleski et al. | 206/303 |
| 3,224,707 | 12/1965 | Arnold . | |
| 3,279,590 | 10/1966 | Gould et al. . | |
| 3,337,682 | 8/1967 | Swett . | |
| 3,375,047 | 3/1968 | Townsend | 206/303 |
| 3,593,943 | 7/1971 | Collmann . | |
| 3,719,271 | 3/1973 | Authier et al. | 206/334 |
| 3,733,478 | 5/1973 | Barker . | |
| 3,809,333 | 5/1974 | Lefever . | |
| 3,823,894 | 7/1974 | Frederick et al. . | |
| 4,015,795 | 4/1977 | Chong . | |
| 4,037,720 | 7/1977 | McGurk | 206/328 |
| 4,089,486 | 5/1978 | Carter . | |
| 4,123,012 | 10/1978 | Hough | 242/85.1 |
| 4,322,045 | 5/1982 | Tellier . | |
| 4,410,084 | 10/1983 | Ladner | 242/85.1 |
| 4,467,979 | 8/1984 | Koehler | 242/96 |
| 4,557,430 | 12/1985 | Bonhard | 242/96 |
| 4,653,833 | 3/1987 | Czubernat et al. . | |
| 4,846,343 | 7/1989 | Rupert . | |

FOREIGN PATENT DOCUMENTS 1210142 10/1970 United Kingdom ................ 206/303

Primary Examiner—David T. Fidei
Attorney, Agent, or Firm—Polster, Polster and Lucchesi

[57] ABSTRACT

A portable container for storing and removing elongated elements, such as an electric extension cord, is disclosed. The portable container includes an open upper end, an inner shaft within the container about which an elongated element is wrapped, and a lid covering the open upper end of the container and having at least one opening which cooperates with the inner shaft to enable an elongated element to be inserted into the container and wrapped around the inner shaft or removed from the container while being unwound from the inner shaft. The inner shaft may be hollow for accommodating and storing various products therein, with a separate inner shaft cover for overlying an open upper end of the inner shaft so as to capture the various products stored therein. The lid may have a second opening through which one end of an elongated element extends with the other end of the elongated element extending through the overlying opening in the lid. The lid may be provided with cord holding clips for releasably holding opposite ends of the elongated element to the lid. A second lid may be provided to extend over the first lid including opposite ends of the elongated element, the openings in the first lid as well as the cord holding clips, with the second lid being releasably secured to the first lid. Suitable handles associated with the first lid or the container or both may be provided for lifting and carrying the portable container.

17 Claims, 2 Drawing Sheets

PORTABLE CONTAINER FOR ELONGATED ELEMENTS

BACKGROUND OF THE INVENTION

The present invention relates to a portable container for storing and removing an elongated element, such as an electric extension cord, hose, wire and various other elongated elements.

Anyone that has ever used an electric extension cord in lengths of twenty-five feet (25') or fifty feet (50') or more understands the difficulty in not only unwinding the cord for use, but also in rewinding the cord for storage purposes. Because such cords are difficult to keep under control, the cord becomes easily entangled as well, causing continuing problems in unwinding or rewinding the cord, as well as moving the cord from location to location.

Homeowners face such problems only infrequently; however, skilled workmen encounter such problems almost daily. In some instances, workers have become so disenchanted with tangled cords that they have simply thrown the cords away, rather than take the time and trouble to untangle the cord.

Another problem exists in storing extension cords. Homeowners can simply wind up the cord and store it on various hooks in a garage or other storage location. While this is not so easily accomplished, it is an infrequent problem confronting home owners. Skilled workmen, on the other hand, have no convenient place to store such cords, either on the job site or in their trucks/vehicles. As can be easily imagined, winding a cord and placing it either on the floor of a job site or in a truck/vehicle subjects the cord to unwinding, either from movement or from other workmen. Further, there is no assurance that such cords won't become entangled, either upon themselves, or upon other products or articles.

One way in which such cord problems are overcome is to use a spring acting or return reel, such as employed in floor vacuum cleaners. The cord is pulled through a small opening for unwinding purposes, and then a button is pushed to release a pawl/ratchet mechanism to enable a spring to rewind the cord on the spring acting or return reel. Of course, such devices are extremely costly because of the need to employ various pawl/ratchet mechanisms and springs. Another practical approach is simply to wind the cord on a reel; however, for reasons discussed in detail below, this does not meet all the needs of skilled workmen and homeowners, as will become apparent.

Other prior art approaches have utilized a cord caddy as shown in U.S. Pat. No. 3,337,682 where a running length of cord is partially stored in a portable container; a portable container for electric cords and connectors, as shown in U.S. Pat. No. 3,733,478, where a spring return reel is employed; a cord storage reel with a separate cover shown in U.S. Pat. No. 2,834,078; a package containing a reel and having a hole for unwinding the elongated element wound about the reel as shown in U.S. Pat. No. 3,823,894; and various other cord dispensers as shown in U.S. Pat. Nos. 3,224,707; 3,279,590; 3,593,943; 3,809,333; 4,015,795; 4,089,486; 4,322,045 and 4,846,343.

While some of these patents have overcome some of the problems noted above, they do not overcome all of the problems, and further, fall short in meeting the needs of skilled workmen and homeowners who are seeking a practical end economical portable container for storing and removing elongated elements, as well as rewinding such elements, without any of the problems noted above.

SUMMARY OF THE INVENTION

Accordingly, among the several objects and provisions of the present invention include:

The provision of a portable container for winding, storing and unwinding elongated elements such as electric extension cords, hoses, wires and other elongated elements;

The provision of the aforementioned portable container which facilitates the winding and unwinding of an elongated element, while eliminating entanglements;

The provision of the aforementioned portable container including an inner shaft within the container which cooperates with an overlying opening in an associated lid to enable an elongated element or cord to be inserted into the container and wrapped about the inner shaft or removed from the container while being unwound from the inner shaft;

The provision of the aforementioned portable container in which the inner shaft has a hollow interior to accommodate and store various products therein and including a separate inner shaft cover for overlying an open upper end of the inner shaft so as to capture the various products within the inner shaft;

The provision of the aforementioned portable container which holds opposite ends of the elongated element or cord in a fixed position when the element or cord is stored within the container;

The provision of the aforementioned portable container which includes a second lid that extends over the elongated element or cord, the openings in the first lid, as well as the first lid itself, to cover and capture all elements therein;

The provision of the aforementioned portable container which includes handles, either associated with the first lid or the container or both, for lifting and carrying the portable container; and The provision of the aforementioned portable container which utilizes a minimum number of non-moving parts, is simple and easy to manufacture by well known techniques; is convenient, practical and efficient to use; and is otherwise well adapted for the purposes intended.

Briefly stated, the portable container of the present invention includes an open top container, an inner shaft within the container about which an elongated element such as an electric extension cord is wrapped, and a lid covering the open top container and having at least one opening which cooperates with an elongated element, such as an electric extension cord, so as to be inserted into the container and wrapped about the inner shaft or removed from the container while being unwound from the inner shaft.

The inner shaft is peripherally spaced from the container sidewall so as to provide a generally toroidal shaped opening between the inner shaft and the container sidewall within the container for receiving the elongated element such as an electric extension cord. The inner shaft also preferably has a hollow interior to accommodate and store various products therein. A separate inner shaft cover overlies an open upper end of the hollow inner shaft so as to capture the various products stored therein.

The inner shaft has an outer end adjacent the plane of the lid and the overlying opening in the lid is larger than the inner shaft to facilitate entry and removal of an elongated element or cord.

The lid may be provided with a second opening through which one end of the elongated element extends, with the other end of the elongated element extending through the overlying opening in the lid.

The lid may be provided with cord holding clips for releasably holding the opposite ends of the elongated element or cord to the lid.

A second lid may be provided which extends over the opposite ends of the elongated element or cord, the openings in the first lid and the cord holding clips attached to the first lid. The second lid is preferably releasably secured to the first lid.

For lifting and carrying the container, the container may be provided with an overhanging lip adjacent to the open upper end or a separate handle attached to an exterior surface on the sidewall of the container, or both.

These and other objects and advantages of the present invention will become apparent from the description that is to follow.

BRIEF DESCRIPTION OF THE DRAWINGS

In the drawings.

Corresponding reference numerals will be used throughout the various figures in the drawings.

DESCRIPTION OF THE PREFERRED EMBODIMENT

Figure 1:
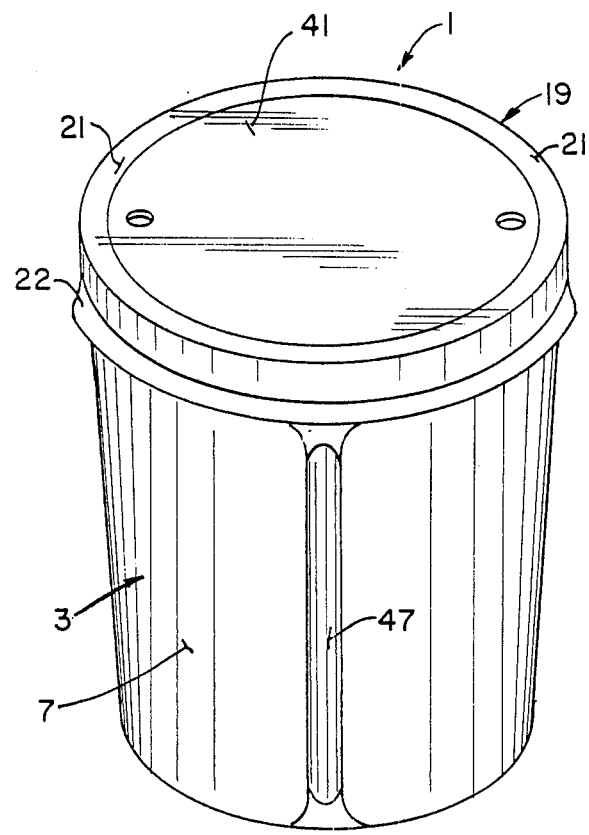
FIG. 1 is a perspective view of a portable container for winding and storing as well as removing elongated elements, such as an electric extension cord.
Figure 2:
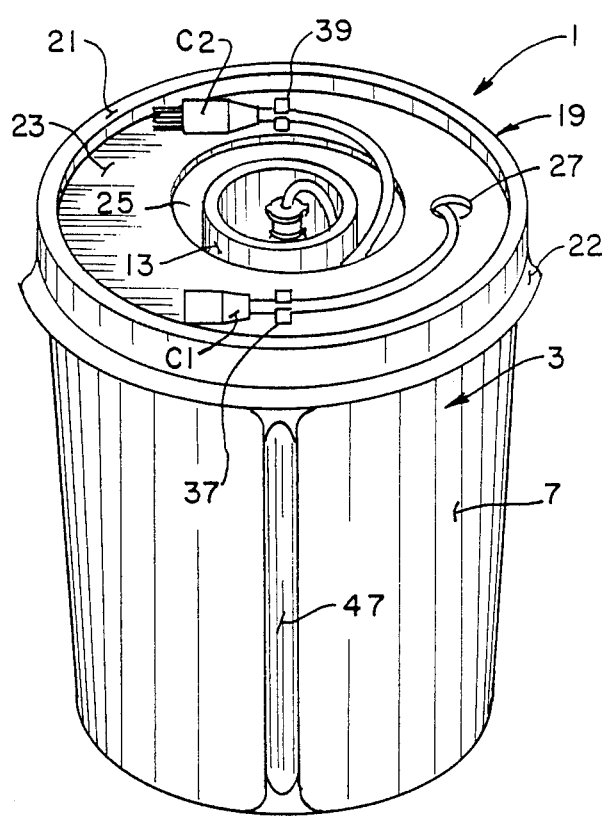
FIG. 2 is a perspective view similar to FIG. 1, but with a covering or second lid removed so as to expose opposite ends of an electric extension cord which are fixed in place by cord housing clips attached to a first lid, the latter being operatively associated with the portable container.

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

In the discussion that is to follow, it will be understood that the term "elongated element" includes such products as an electric extension cord, hose, wire or any other kind of elongated element which is desirably wound and stored as well as unwound in a portable container as disclosed herein. In the drawings, an electric extension cord is illustrated; however, this is representative of any one of a number of elongated elements that may be used with the portable container of the present invention.

It is to be further understood that the present invention is not to be limited by the design, shape or size of the portable container, whether manufactured in one or more parts, as will become apparent below.

Figure 3:
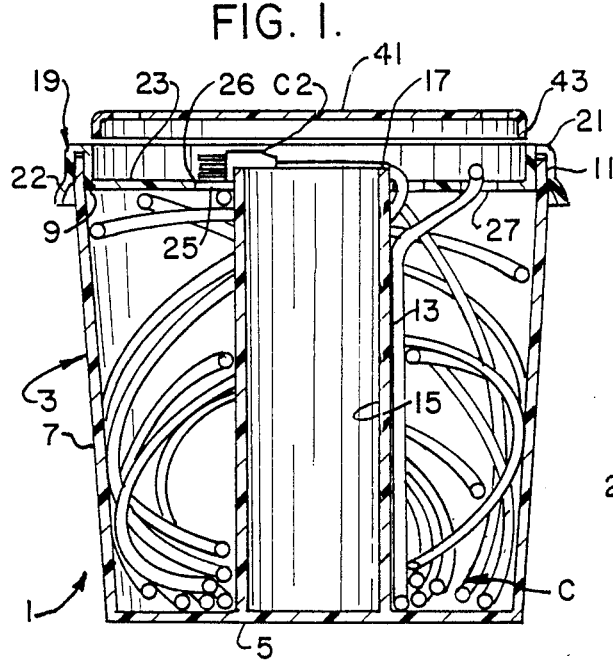
FIG. 3 is a vertical sectional view of the portable container including an inner shaft and openings in the first lid associated with the container for winding and storing, as well as unwinding an electrically extension cord, as shown.
Figure 4:
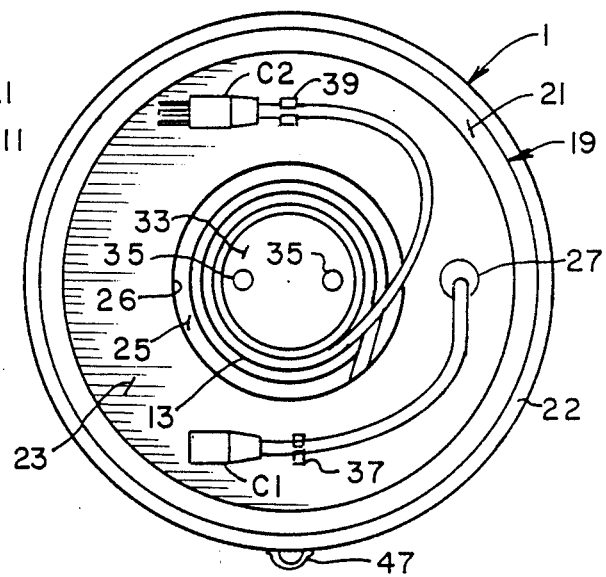
FIG. 4 is a top plan view of the portable container as shown in FIG. 2 of the drawings.

Referring now to the drawings, it will be seen that the portable container 1 of the present invention includes an open top container 3 having a bottom wall 5 and a peripherally continuous and generally upwardly and outwardly extending sidewall 7 which terminates in an open upper end 9 (FIG. 3). Adjacent the open upper end 9 is a rim 11 which has a general cylindrical shape as shown, although other shapes and designs may be used as desired. The open top container 3 is preferably injection molded from a suitable rigid plastic material to provide strength and durability during use.

The open top container 3 includes an inner shaft 13 which is preferably integrally molded to the bottom wall 5 and extends upwardly toward the open upper end 9. The inner shaft 13 is preferably generally cylindrically shaped with a hollow interior 15 and terminates at an open upper end 17 which is in general alignment with the outer rim 11 of the container 3.

A container lid 19 is provided for covering the open upper end 9 of the container 3. The container lid 19 includes a peripherally continuous U-shaped outer rim 21 which is adapted to matingly engage the rim 11 of the container 3, as shown in FIG. 3 of the drawings. The container lid 19 includes a wall 23 which extends within the U-shaped outer rim 21 so as to provide a horizontally directed wall within the U-shaped outer rim 21. Like the open top container 3, the container lid 19 is preferably molded from a rigid plastic material to provide durability for long term use. However, the outer U-shaped rim 21 is sufficiently flexible to expand over the upper rim 11 of the container 3 for cooperative mating engagement therewith, as shown in FIG. 3 of the drawings. The U-shaped rim 21 may also be provided with an overhanging lip 22, in order to permit gripping, lifting and carrying of the portable container 1, as desired.

The container lid 19 is provided with a central opening 25 which overlies the inner shaft 13 and which cooperates with the inner shaft 13 to enable an electric extension cord C to be inserted into the container 3 and wrapped about the inner shaft 13 or removed from the container 3 while being unwound from the inner shaft 13. Specifically, the inner shaft 13 has its outer end 17 adjacent the plane of the container lid 19, with the overlying opening 25 being larger than the inner shaft 13 to facilitate entry and removal of an electric extension cord C as will be described in detail below. An outer circumferential or marginal edge 26 extends around the opening 25 and provides a confined space or opening between the edge 26 and the inner shaft 13, for controlling the insertion and removal of the electric extension cord C, as will be subsequently discussed.

The container lid 19 further includes a second opening 27, preferably substantially smaller than the central opening 25, for receiving one end C1 of the electric extension cord C while the other end C2 of the electrical extension cord C extends out through the central opening 25 in the container lid 19. Preferably, the electric extension cord C is wound about the inner shaft with one end C1 extending through the second opening 27 in the lid 19, while the remaining part of the cord is wound about the inner shaft 13, in order that the second end C2 extends through the central opening 25 in the lid 19. This facilitates removal and rewinding of the electric extension cord C through the central opening 25, to be discussed below.

Figure 5:
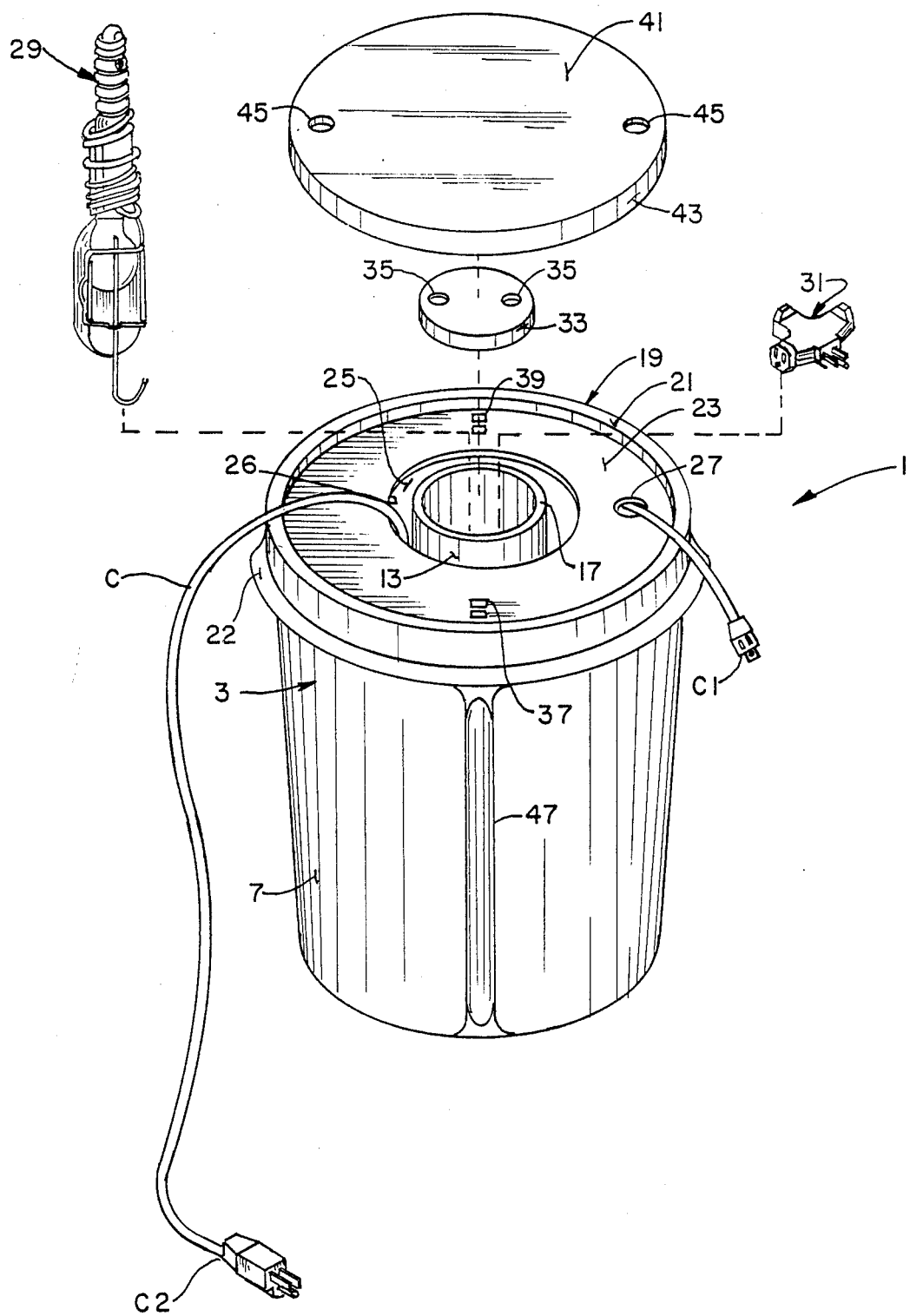
FIG. 5 is an exploded perspective view of the portable container illustrating the manner in which an electric extension cord is wrapped or unwound relative to the inner shaft within the container, as well as showing a hollow inner shaft for receiving various products including a hang light with extension cord, adaptor multi-plug or other products, as may be desired.

The inner shaft 13 is preferably provided with the hollow interior 15 so as to accommodate and store various products therein. As best seen in FIG. 5 of the drawings, such items can include a hang light 29 with extension cord, a multi-plug adaptor 31 and various other tools which a skilled workman or homeowner may desire to keep with the portable container 1. A separate inner shaft cover 33 overlies the open upper end 17 of the hollow inner shaft 13 so as to capture various products therein. The separate inner shaft cover 33 may be provided with fingerhole openings 35, 35 or other suitable structure for lifting and re-setting the separate inner shaft cover 33 relative to the open end 17 of the hollow inner shaft 13.

The container lid 19 is provided with cord holding clips 37, 39 on opposite sides of the central opening 25 for releasably holding the opposite ends C1 and C2 relative to the container lid 19, when the electric extension cord C is stored within the portable container 1. The cord holding clips 37, 39 may be either fastened to the wall 23 of the lid 19 or may be molded integral therewith.

A second lid 41 is also preferably provided to fit within the U-shaped rim 21 of the first or container lid 19 so as to extend over the opposite ends C1, C2 of the electric extension cord C, the cord holding clips 37, 39 and the openings 27, 29 in the first or container lid 19. Preferably, the second lid 41 has a depending rim 43 which is resiliently and releasably engaged against the inner area of the U-shaped outer rim 21 of the first or container lid 19 so as to resiliently and releasably lock the second lid 41 to the first lid 19. The second lid 41 is also provided with fingerhole openings 45, 45 or other equivalent structure for lifting and re-setting the second lid 41 relative the first or container lid 19.

For lifting and carrying the portable container 1, the container lid 19 may be provided with an overhanging lip 22 which extends downwardly and outwardly from the U-shaped rim 21, for gripping and lifting the portable container 1 for carrying purposes. Alternatively or in addition to the overhanging lip 22, a separate handle 47 may be attached to an exterior surface of the sidewall 7, or may be integrally formed therewith, as desired. Thus, the portable container 1 may be easily lifted and carried, whenever and wherever desired. In addition, a flat surface may be provided in the container sidewall, preferably opposite the handle 27, to provide a stop against rolling of the container and to allow the container to rest in a horizontal position.

Referring now to the manner in which the electric extension cord C is used in conjunction with the portable container 1, it will be noted, as shown in FIG. 3 of the drawings, that the substantially cylindrically shaped inner shaft 13 is peripherally spaced from the sidewall 7 so as to provide a generally toroidal shaped opening between the inner shaft 13 and the sidewall 7 within the open top container 3 for receiving the electric extension cord C therein. One end C1 of the electric extension cord C is threaded through the opening 27 in the container lid 19, while the balance of the electric extension cord C is wound about the inner shaft 13, within the space between inner shaft 13 and the sidewall 7 of the container 3, as shown in FIG. 3 of the drawings. At the other end of the cord C, the second end C2 will then extend through the central opening 25 in the container lid 19. The end C1 of the electric extension cord C is attached to the cord holding clip 37, while the second end C2 is releasably secured to the other cord holding clip 39, when the electrical extension cord C is stored within the container 3. Thereafter, the second lid 41 is secured in place within the U-shaped rim 21 of the first or container lid 19.

When it is desired to use the electric extension cord C, the second lid 41 is removed, such as through the fingerhole openings 45, 45. The second end C2 of the electrical extension cord C is then removed from the cord holding clip 39 and the electrical extension cord C is pulled through the opening 25 in the container lid 19. The outer end 17 of the inner shaft 13 is adjacent the plane of the container lid 19 while the overlying opening 25 is suitably dimensioned to be larger than the inner shaft 13. This provides only limited space for the entry and removal of the electric extension cord C. Should any hang-ups occur, resulting from twisted segments of the electrical extension cord C, the confined space between the inner shaft 13 and the circumferential or marginal edge 26 surrounding the overlying opening 25, enables the twisted or turned segments of the electrical extension cord C to be eliminated by simply pulling or jerking the electric extension cord C. The confined space, between the inner shaft 13 and the circumferential or marginal edge 26, thus enables the electric extension cord C to be quickly and easily removed from the portable container 1, even where there are "hang-ups" in the electrical extension cord C.

The confined space between the inner shaft 13 and the circumferential or marginal edge 26 surrounding the opening 25 is also sufficiently large enough to permit threading and winding of the electrical extension cord around the inner shaft 13, when it is desired to store the electric extension cord C in the portable container. This is simply accomplished by inserting the electric extension cord C in a progressive spiral-like or winding motion, while inserting the electrical extension cord C into the confined space between the inner shaft 13 and the circumferential or marginal edge 26 surrounding the opening 25. Once inside the open-top container, the electric extension cord C is able to expand to fill the toroidal-shaped space between the inner shaft 13 and the sidewall 7 of the container, such that suitable lengths of electrical extension cord C can be stored within the portable container 1, as will be apparent.

Where it is desired to use the hang light 29 with extension cord, the multi-plug adaptor 31 or other tools that may be stored within the inner shaft 15, the separate inner shaft cover 33 may be simply removed for this purpose, using the fingerhole openings 35, 35 or other equivalent structure.

From the foregoing it will now be appreciated that the portable container of the present invention enables an electric extension cord C to be inserted into the container 3 and wrapped about the inner shaft 13 or removed from the container 3 while being unwound from the inner shaft 13. Thus, an electric extension cord C can be stored in a protected environment, without subjecting the electric extension cord to unwinding or entanglements. The portable container 1 may be easily moved to any location desired, with the electric extension cord C quickly and easily unwound from the portable container 1 and subsequently re-wound and stored therein.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A portable electric extension cord container comprising:
    a container having a bottom wall and a peripherally continuous sidewall extending upwardly from the bottom wall and terminating in an open upper end;
    an inner shaft within said container which is attached to said bottom wall and which extends upwardly towards the open upper end of said container, said inner shaft being peripherally spaced from the sidewall to enable an electric extension cord to be wrapped around the inner shaft within the container; and
    a lid covering the open upper end of said container said inner shaft having an outer end adjacent the plane of said lid, said lid having opening means overlying said inner shaft which is larger than said inner shaft and which cooperates with said inner shaft to enable an electric extension cord to be inserted into the container and wrapped about the inner shaft or removed from the container while being unwound from the inner shaft.

2. The container as defined in claim 1 wherein said inner shaft is substantially cylindrically shaped to provide a generally toroidal shaped opening between the inner shaft and the sidewall within the container for receiving an electric extension cord therein.

3. The container as defined in claim 2 wherein said inner shaft has a hollow interior to accommodate and store various products therein for use with an electric extension cord.

4. The container as defined in claim 3 and including a separate inner shaft cover for overlying an open upper end of said inner shaft so as to capture various products stored therein.

5. The container as defined in claim 4 wherein said opening means comprises an opening in said lid which is sized relative to said inner shaft to engage and control the winding or unwinding of an electric extension cord during insertion or removal from the container.

6. The container as defined in claim 5 and including a second opening provided in said lid through which one end of an electric extension cord extends, the other end of said extension cord extending through the overlying opening in said lid.

7. The container as defined in claim 6 wherein said lid is provided with cord holding clips for releasably holding the opposite ends of an electric extension cord to the lid.

8. The container as defined in claim 7 and including a second lid which extends over the opposite ends of an electric extension cord, the openings in said first lid and the cord holding clips attached to said first lid, and said second lid being releasably secured to said first lid.

9. The container as defined in claim 8 including an overhanging lip attached to the container adjacent the open upper end thereof for lifting and carrying the container.

10. The container as defined in claim 9 and further including a separate handle attached to an exterior surface of said sidewall for lifting and carrying said container.

11. A portable electric extension cord container comprising:
    a container having a bottom wall and a peripherally continuous sidewall extending upwardly from the bottom wall and terminating in an open upper end;
    an inner shaft within said container which is attached to said bottom wall and which extends upwardly towards the open upper end of said container, said inner shaft being peripherally spaced from the sidewall to enable an electric extension cord to be wrapped around the inner shaft within the container; and
    a lid covering the open upper end of said container, said lid having opening means overlying said inner shaft which is larger than and which cooperates with said inner shaft to enable an electric extension cord to be inserted into the container and wrapped about the inner shaft or removed from the container while being unwound from the inner shaft, one end of an electric cord extending through said overlying opening and a second end of an electric extension cord extending through a second opening in said lid; and
    means for holding the ends of an electric extension cord to the lid when wrapped about the inner shaft within said container.

12. The container as defined in claim 1 wherein said inner shaft is substantially cylindrically shaped to provide a generally toroidal shaped opening between the inner shaft and the sidewall within the container.

13. The container as defined in claim 2 wherein said inner shaft has a hollow interior to accommodate and store various products therein for use with an electric extension cord.

14. The container as defined in claim 3 and including a separate inner shaft cover for overlying an open upper end of said inner shaft so as to capture various products stored therein.

15. A portable electric extension cord container comprising:
    a container having a bottom wall and a peripherally continuous sidewall extending upwardly therefrom and terminating in an upper end;
    a substantially cylindrically shaped inner shaft attached to the bottom wall of said container and extending upwardly towards and terminating in the vicinity of the open upper end of said container, said inner shaft being peripherally spaced from the sidewall to enable an electric extension cord to be wrapped around the inner shaft within the container, said inner shaft having a hollow interior to accommodate and store various products therein for use with an electric extension cord, a separate cover for overlying an open upper end of said inner shaft so as to capture various products therein;
    a first lid covering the open upper end of said container, said lid having an opening overlying said inner shaft and being larger than said inner shaft to enable an electric extension cord to be inserted into the container and wrapped around the inner shaft or removed from the container while being unwound from the inner shaft, one end of an electric extension cord extending through said overlying opening and a second end of an electric extension cord extending through a second opening in said lid;

cord holding clips for releasably holding opposite ends of an electric extension cord to said first lid;

a second lid overlying the first lid including the openings therein, the cord holding clips and opposite ends of an electric extension cord releasably secured by said cord holding clips, said second lid being releasably secured to said first lid; and handle means for lifting and carrying said container.

16. A portable container for storing and removing an elongated element, said container having an open upper end, an inner shaft within the container about which an elongated element is wrapped, and a lid covering the open upper end of said container, said lid having opening means which cooperates with the inner shaft to enable an elongated element to be inserted into the container and wrapped about the inner shaft or removed from the container while being unwound from the inner shaft, one end of an elonaged element extending through the cooperating opening in said lid, a second end of said elongated element extends through a second opening in said lid, and means associated with said lid for releasably holding opposite ends of an elongated element in a fixed position while the remainder of an elongated element is wrapped about the inner shaft in stored condition within said container.

17. The container as defined in claim 16 wherein the inner shaft has a hollow interior and an open upper end, the hollow interior of said inner shaft accommodating and storing various products therein, and a separate inner shaft cover overlying the open upper end of said inner shaft so as to capture various products stored therein.

* * * * *

UNITED STATES PATENT AND TRADEMARK OFFICE
CERTIFICATE OF CORRECTION

PATENT NO. : 4,984,685

DATED : January 15, 1991

INVENTOR(S) : Frank A. Douglas

It is certified that error appears in the above-identified patent and that said Letters Patent is hereby corrected as shown below:

On the title page, item [76] Inventors: "Cedal Hill, Missouri" should read --Cedar Hill, Missouri--.

Signed and Sealed this

Twentieth Day of October, 1992

Attest:

DOUGLAS B. COMER

Attesting Officer    Acting Commissioner of Patents and Trademarks